(12) United States Patent
Antonellis et al.

(10) Patent No.: US 7,206,409 B2
(45) Date of Patent: Apr. 17, 2007

(54) MOTION PICTURE ANTI-PIRACY CODING

(75) Inventors: Darcy Antonellis, Granada Hills, CA (US); Jeffrey J. Bartley, Valencia, CA (US); Margit Elisabeth Elo, Pasadena, CA (US); Jean Pierre Gagnon, Burbank, CA (US); William B. Hogue, Jr., Simi Valley, CA (US); Edward J. Price, Studio City, CA (US)

(73) Assignees: Technicolor, Inc., North Hollywood, CA (US); Warner Bros. Entertainment, Inc., Burbank, CA (US)

( * ) Notice: Subject to any disclaimer, the term of this patent is extended or adjusted under 35 U.S.C. 154(b) by 484 days.

(21) Appl. No.: 10/670,682

(22) Filed: Sep. 25, 2003

(65) Prior Publication Data

US 2004/0109016 A1    Jun. 10, 2004

Related U.S. Application Data

(60) Provisional application No. 60/423,217, filed on Nov. 1, 2002, provisional application No. 60/414,179, filed on Sep. 27, 2002.

(51) Int. Cl.
*H04N 7/167*  (2006.01)
*H04L 9/00*  (2006.01)

(52) U.S. Cl. .................. 380/202; 380/201; 713/167; 726/32

(58) Field of Classification Search .............. 380/202
See application file for complete search history.

(56) References Cited

U.S. PATENT DOCUMENTS

| | | | |
|---|---|---|---|
| 4,969,041 | A | 11/1990 | O'Grady et al. |
| 5,200,822 | A | 4/1993 | Bronfin et al. |
| 5,646,997 | A | 7/1997 | Barton |
| 5,721,788 | A | 2/1998 | Powell et al. |
| 5,739,864 | A | 4/1998 | Copeland |
| 5,959,717 | A | 9/1999 | Chaum |
| 5,991,500 | A | 11/1999 | Kanota et al. |
| 6,266,430 | B1 | 7/2001 | Rhoads |
| 6,427,012 | B1 | 7/2002 | Petrovic |
| 6,430,301 | B1 | 8/2002 | Petrovic |
| 2002/0122490 | A1* | 9/2002 | Lin et al. .............. 375/240.25 |
| 2002/0168069 | A1 | 11/2002 | Tehranchi et al. |

* cited by examiner

*Primary Examiner*—Kambiz Zand
(74) *Attorney, Agent, or Firm*—Sacco & Associates, PA; Robert J. Sacco (57) ABSTRACT

Method and apparatus for uniquely identifying a copy of a motion picture disposed on a media. The method includes the steps of selecting two or more motion picture scenes. Each of the motion picture scenes is an identifiable portion of the motion picture distinct from every other portion of the motion picture. Once the scenes have been identified, two or more sequences can be defined within each of the motion picture scenes such that each sequence includes two or more frames. For example, the motion picture can have three scenes, each divided into twenty eight sequences, with each of the sequences containing 12 frames. Once the scenes and sequences have been selected, at least one of the sequences from each scene is marked to define a uniquely identifiable marking pattern on the media.

55 Claims, 4 Drawing Sheets

MOTION PICTURE ANTI-PIRACY CODING

CROSS REFERENCE TO RELATED APPLICATIONS

This Application is related to, and claims priority of U.S. provisional patent application No. 60/414,179, filed Sep. 27, 2002, and U.S. provisional patent application No. 60/423,217 filed Nov. 1, 2002.

BACKGROUND OF THE INVENTION

1. Statement of the Technical Field

The inventive arrangements relate generally to the field of protecting film against illegal copying, and in particular, to an improved method for film encoding to facilitate the identification of the source of films illegally copied by camcorders and to media encoded in accordance with the method.

2. Description of the Related Art

Piracy issues in connection with the theatrical exhibition of motion picture films are well known. Once a film distributor distributes prints of a motion picture film to exhibitors for theatrical exhibition, a certain degree of control over the product is lost. In the regular course of exhibiting the film, a customer in the theater may surreptitiously record the film using, e.g., a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy can be made. Alternatively, the print itself may be scanned to create a video master.

In 1982, the Motion Picture Association of America (MPAA), together with the Kodak Corporation, developed a technology for uniquely identifying film prints. This technology is commonly known as Coded Anti-piracy (CAP) coding. The code is a series of dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print number. The film prints are usually coded for each theatre in which a film is distributed.

Historically, aiming an analog camcorder at a theatre screen produced a poor quality, flickering image, but the coding dots usually survived the copying and reproduction process. Improved digital camcorders not only take better pictures, but the video compression algorithms that are commonly employed when the pirated film is stored in a digital format or transported over the internet, tend to obliterate the CAP codes. Because the CAP coding scheme is defeated if even only a small number of the coding dots are lost in image processing, the viability of CAP coding has diminished with the advent of digital video compression and distribution technologies.

Another limitation of the CAP coding system is that a total of 2023 unique configurations were developed in 1982. At the time, this was sufficient because it was roughly equivalent to the number of theaters in operation at the time and substantially exceeded the number of prints that had been made in connection with even the largest motion picture releases. Today there are over 20,000 theaters worldwide and major motion picture releases of more than 5,000 prints are increasingly common. Accordingly, there are an insufficient number of codes to uniquely identify each film print that is distributed.

Yet another limitation of the CAP coding system concerns the size of the code image superimposed on the print. The dots representing the code are extremely small and diffuse. These characteristics result in disintegration of the image during compression. Because the CAP code image configuration is the unique identifier, the entire image must survive. Therefore CAP coding is dependent upon 100% image survival.

Further, the frequency of code image repetition in CAP coding systems increases the likelihood that the public will see the image. This is undesirable as it can distract viewers from the film content or cause them to form an opinion that a particular theatre shows poor quality prints. Accordingly, there is a pressing need for a successor to CAP coding to detect film piracy.

SUMMARY OF THE INVENTION

The invention concerns a method and apparatus for uniquely identifying a copy of a motion picture disposed on a media. The method can include the steps of selecting two or more motion picture scenes, where each of the scenes comprise an identifiable portion of the motion picture distinct from every other portion of the motion picture. Once the scenes have been identified, two or more sequences can be defined within each of the motion picture scenes such that each sequence includes two or more of frames. For example, the motion picture can have three scenes, each divided into twenty eight sequences, with each of the sequences containing 12 frames. Once the scenes and sequences have been selected, the method can continue with the step of selectively marking at least one of the sequences from each scene to collectively define a uniquely identifiable marking arrangement or pattern on the media.

The motion picture scenes can be selected so that they are separated from each other by a buffer section of the motion picture. Further, the motion picture scenes can be selected by identifying portions of the motion picture that include relatively little panning motion. The motion picture scenes can also be selected by identifying portions of the motion picture that have density, lighting and/or coloration characteristics that enhance the visibility of the marking pattern.

The marking step described above can include marking one or more consecutive frames within each sequence that is to be marked. For example, between two and five frames can be marked within each such sequence. Further the marking step can include selecting at least one of the marked frames to include a first frame appearing within each of the marked sequences. The marking can be accomplished by modifying the media to cause a mark to be associated with a particular frame. Consequently, when the image associated with such frame is displayed, the mark will be visible. The mark which is formed can include a constellation of dots. Each of the dots can have a profile corresponding to a predetermined shape which can be any suitable polygon, circular, elliptical shape. The color of the marking can be selected to enhance a contrast with an image associated with a frame so that the marking can be more easily detected at a subsequent time. Further, the constellation of dots can be varied by production location. Consequently, a uniquely identifiable constellation of dots can be associated with each one of a number of production locations. In this way, the constellation can identify the production location as the source of the copy.

According to one aspect of the method, the media can be selected to be a film print. In that case, the marking step can include physically forming the marking on at least one frame. Alternatively, the medium can be selected to be a digital storage medium. In that case, the modification of the media can include modifying a digital data on the digital storage medium. In that case, the modifying step can be advantageously selected to cause the marking to appear within at least one image that is displayed during playback of the motion picture contained on the digital storage medium.

According to another aspect of the invention, each of the sequences within each scene can correspond to a number. In that case, the marking step can include marking respective sequences in each of the scenes so that the combination of the numbers assigned to the sequences that are marked correspond to a film print identification number assigned to the particular copy. The method can also include varying the marking pattern for each copy of the motion picture that is produced so that no two copies of the motion picture have the same marking pattern.

Notably, a second group of scenes can also be selected. As with the first group of scenes described above, each of the second group of scenes can comprise an identifiable portion of the motion picture distinct from every other portion of the motion picture. The method can include the step of defining two or more sequences within each of the second group of motion picture scenes, with each of the sequences including two or more frames. Thereafter, the method can continue with the step of selectively marking at least one of the sequences from each of the second group of scenes to repeat the uniquely identifiable marking pattern.

The invention can also include a security coded motion picture disposed on a media. The motion picture can be divided into two or more scenes, so that each of the scenes comprises an identifiable portion of the motion picture distinct from every other portion of the motion picture. Each of the motion picture scenes can be advantageously separated from each other by a buffer section of the motion picture. Further, sequences can be defined within each of the scenes, so that each sequence includes two or more frames. For example, a motion picture media can contain at least three scenes, each divided into at least ten of the sequences, with each sequence containing at least eight frames. At least one of the sequences from each scene is advantageously marked to collectively define a uniquely identifiable marking pattern.

According to one aspect, the motion picture scenes can be comprised of portions of the motion picture that include relatively little panning motion. Further, such motion picture scenes can have at least one of density, lighting and coloration characteristics that enhance the visibility of the marking pattern.

Each of the sequences that is marked comprises at least one marked frame. If more than one frame is marked, the marked frames are arranged consecutively. For example, each of the sequences that is marked can include between two and five consecutive frames that have been marked. Further, at least one of the marked frames can advantageously be selected so that it is a first frame in sequence appearing within the sequence that has been marked.

The marked frame can include any frame that has been intentionally modified so as to cause a visible mark to be superimposed on an image associated with the frame when the image is displayed. For example, the mark can be a constellation of dots as described above. Further, the constellation of dots can be exclusively associated with one of a plurality of production locations, whereby the constellation can identify the production location as the source of the security coded motion picture.

The media can be a film print, in which case the marking can consist of an image disposed on the film print. Alternatively, the medium can be a digital storage medium wherein the digital data on the digital storage medium is modified to produce the marking. In particular, the digital data can be modified to cause the marking to appear within at least one image that is displayed during playback of the motion picture contained on the digital storage medium. In any case, the marking pattern for each copy of the motion picture can be advantageously varied so that no two copies of the motion picture have the same marking pattern.

Further, a second group of motion picture scenes can be selected on the media. As with the first group, each of the second group of motion picture scenes is an identifiable portion of the motion picture distinct from every other portion of the motion picture. Two or more sequences are defined within each of the second group of motion picture scenes, with each sequence comprising a number of frames. At least one of the sequences from each of the second group of scenes is marked to repeat the uniquely identifiable marking pattern.

According to yet another aspect, the invention can include an apparatus for uniquely identifying a copy of a motion picture disposed on a media. The apparatus can include a computer processor responsive to a user input identifying two or more scenes as described above. The computer processor can use this information to define sequences within each of the plurality of motion picture scenes, with each sequence comprising a plurality of frames. The apparatus can also include suitable media modification equipment for selectively marking at least one of the sequences from each scene to define a uniquely identifiable marking pattern.

According to a another aspect of the invention, the security coded motion picture can include a motion picture recording comprised of one or more frames. Each frame can contain at least a portion of an image associated with the motion picture. At least one reference point frame within the motion picture can be defined such that the relative position of one or more other frames can be uniquely identified. For example, the reference point can correspond to a frame occurring at a beginning of a particular scene of the motion picture or the first frame corresponding to a particular image forming a part of the motion picture. Any readily identifiable portion of the motion picture can be used for this purpose. Further, at least one of the frames can contain a mark. The position of the marked frame relative to the one or more reference point frames can uniquely identify a production copy of the motion picture. One or more of the marked frames dispersed at different locations in the motion picture can collectively define a uniquely identifiable marking pattern. Further, each marked frame can be part of a series of consecutively marked frames. For example, between two to ten marked frames can be provided in each series.

The inventive arrangements can also include a method for security coding a motion picture that includes the steps of storing on a media a motion picture recording comprised of one or more frames, each containing at least a portion of an image associated with the motion picture. The method can further include selectively marking at least one of the frames having an identifiable position relative to one or more predefined reference point frames in the motion picture, so that the position of the at least one marked frame uniquely identifies a particular production copy of the motion picture.

According to yet another embodiment, the invention can include an apparatus for security coding a motion picture. The apparatus can include a recording device for storing on a media a motion picture recording that includes a plurality of frames, each containing at least a portion of an image associated with said motion picture. A marking device can be provided for selectively marking at least one of the frames having an identifiable position relative to one or more predefined reference point frames in the motion picture. The position of the one or more marked frames relative to the reference point frames can uniquely identify a particular production copy of the motion picture.

DETAILED DESCRIPTION OF THE PREFERRED EMBODIMENTS

Motion pictures are commonly distributed to theaters around the world for exhibition. Accordingly, in order to distribute the motion picture to many locations simultaneously, multiple production copies of the motion picture are typically produced on a suitable media. Film is presently the most common media on which motion pictures are distributed to theatres. For example, a feature length film typically consists of anywhere from five to eight reels of film. However, those skilled in the art will recognize that the invention described herein for preventing piracy of motion pictures is not limited in its application to film media, but can instead be used with any media on which a motion picture can be recorded. Such media can include any of a wide variety of existing technologies including DVD, CD ROM, and magnetic disc as well as any other optical, electro-optical, magneto-optical storage formats as are now known or which may become known in the future.

Figure 1:
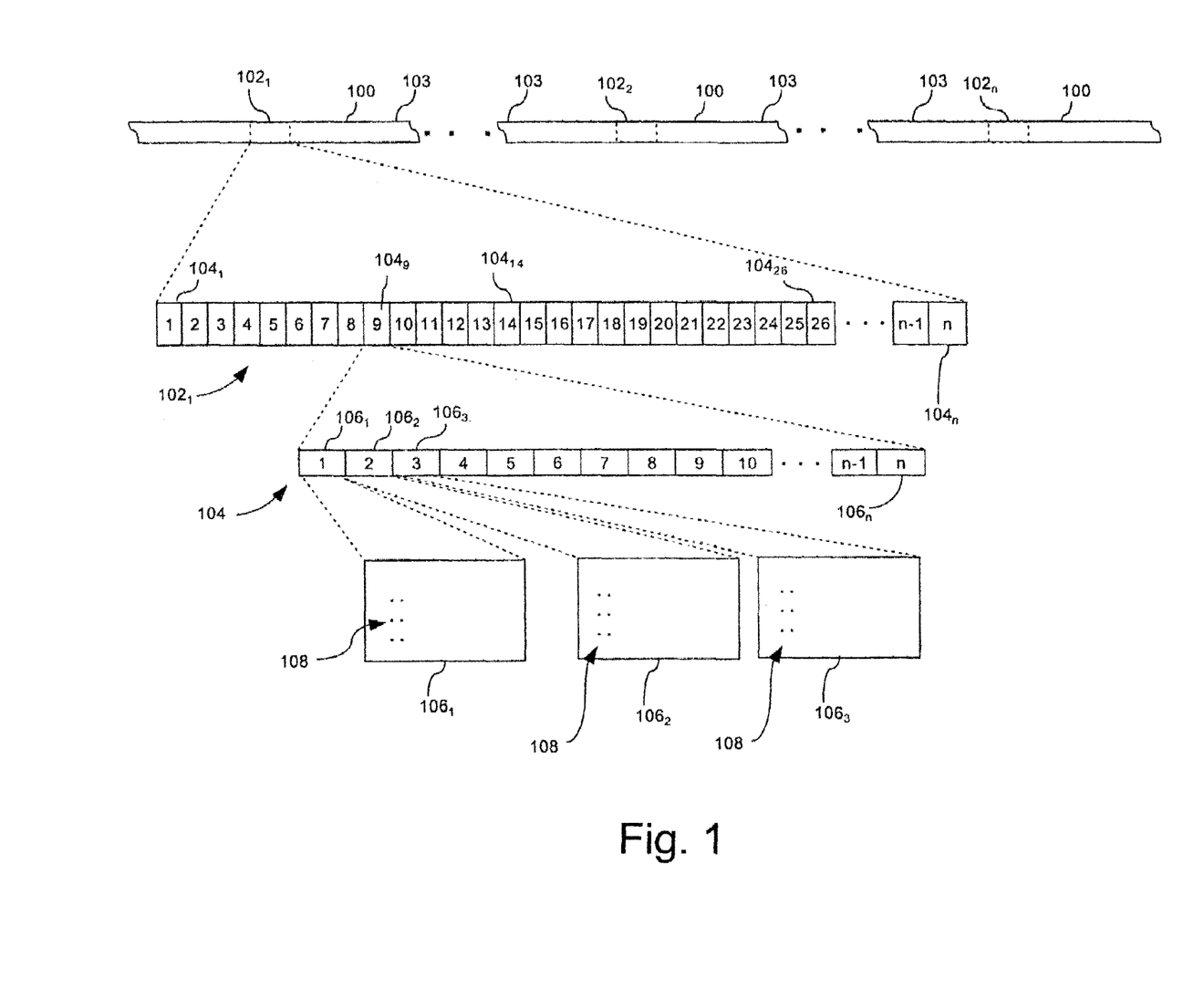
FIG. 1 is a schematic representation of a motion picture stored on a media that is useful for understanding the invention.

FIG. 1 is a representation of a motion picture stored on a media 100. A process for uniquely identifying each production copy of the motion picture that is produced for distribution to theatres can begin by selecting two or more scenes of the motion picture. Each of the scenes can comprise an identifiable portion of the motion picture distinct from every other portion of the motion picture. In FIG. 1, scenes $102_1$ through $102_n$ are shown, it being understood that the invention is not limited to any particular number of selected scenes.

Once the scenes $102_1$ through $102_n$ have been chosen, two or more sequences 104 can be defined within each of the scenes. The sequences 104 are preferably of equal length and each sequence can include two or more frames 106 that contain image information. For example, within a motion picture, three scenes $102_1$, $102_2$, $102_3$, can be identified and each scene can be divided into twenty eight sequences $104_1$ through $104_{28}$, with each of the sequences containing twelve frames $106_1$ though $106_{12}$.

Once the scenes and associated sequences have been defined, one or more selected sequences from each scene can be marked to produce a uniquely identifiable pattern. For example, referring to FIG. 1, a particular production copy of a motion picture stored on media 100 can be marked so that in scene $102_1$, sequence $104_9$ is marked; in scene $102_2$, sequence $104_{14}$ is marked, and in scene $102_n$, sequence $104_7$ is marked. The film can thus be assigned a serial number 9-14-7, corresponding to the number of the sequences marked in each scene. In this way, the particular sequence or sequences marked within each scene define the code that allow a particular production copy of the motion picture to be identified.

Referring again to FIG. 1, the marking process can include the step of marking one or more frames 106 that are contained within a particular sequence $104_n$. According to a preferred embodiment, between two to five consecutive frames can be marked anywhere within the sequence. For example, the first three frames appearing in a sequence can be marked. The marking can be accomplished by modifying the media to cause a mark to be associated with a particular frame. Consequently, when the image associated with such frame is displayed, the mark will be visible. The mark which is formed can include a constellation of dots. Each of the dots can have a profile corresponding to a predetermined shape which can be any suitable polygon, circular, elliptical shape. The color of the marking can be selected to enhance a contrast with an image associated with a frame so that the marking can be more easily detected at a subsequent time. Further, the constellation of dots can be varied by production location. Consequently, a uniquely identifiable constellation of dots can be associated with each one of a number of production locations. In this way, the constellation can also identify a particular production location as the source of the original production copy.

According to one embodiment of the invention, the motion picture scenes $102_1$ through $102_n$ can be selected so that they are separated from each other by a buffer section 103 of the motion picture comprising one or more frames. Further, the motion picture scenes can be selected by identifying portions of the motion picture that tend to lessen the potential that a mark will be noticed by a viewer. Scenes having a substantial amount of action therein can be advantageous as the viewer's eye is drawn to the motion in the scene and the viewer is therefore less likely to notice the mark. However, scenes that include panning motion are less desirable because the mark will appear stationary as the background in the scene moves in accordance with the panning action of the camera. This is a disadvantage as it tends to draw attention to the mark. The motion picture scenes can also be advantageously selected by identifying portions of the motion picture that have density, lighting and/or coloration characteristics that enhance the visibility of the marking pattern.

According to another aspect of the invention, each of the sequences within each scene can correspond to a number. In that case, the marking step can include marking respective ones of the sequences in each of the scenes so that the combination of the numbers assigned to the sequences that are marked correspond to a film print identification number assigned to the particular copy. The method can also include varying the marking pattern for each copy of the motion picture that is produced so that no two copies of the motion picture have the same marking pattern.

Figure 2:
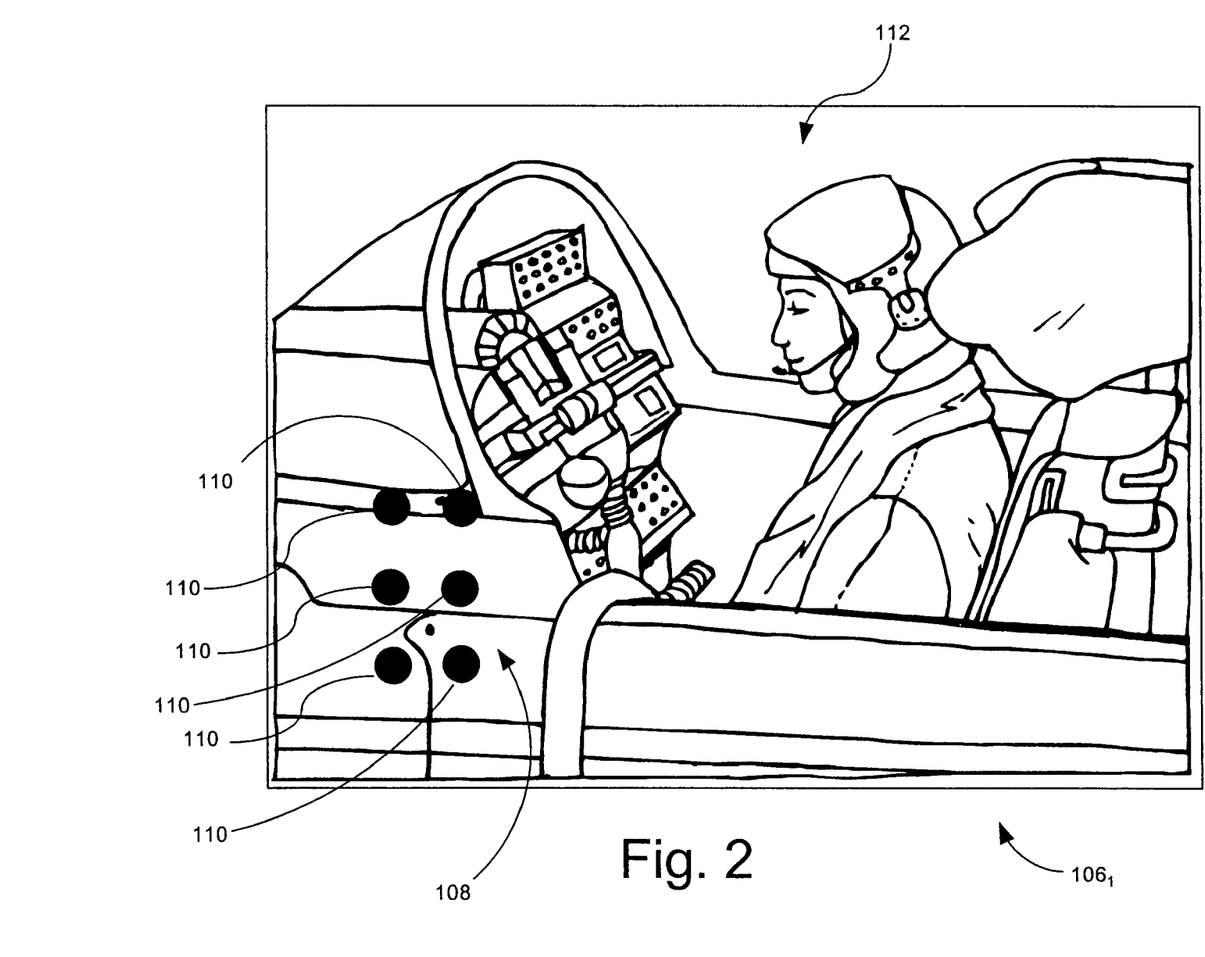
FIG. 2 shows a frame containing an image that has been marked.

FIG. 2 shows an enlarged view of a single frame $106_1$ in FIG. 1, which is useful for understanding how a frame can be marked. The mark 108 that is applied to a frame can include any modification of the media that will produce a visually identifiable feature when the frame is displayed. For example, the feature can be a single dot 110, a constellation or grouping of dots 110 arranged in a particular pattern, a pattern of straight or curved lines and any combination thereof. Dots 110 can be of any particular shape including circles, ovals, ellipses, polygons, and any other regular or irregular shape. Even a mark that appears to be a random scratch can be used for this purpose, provided that the scratch is readily identifiable when the frame is displayed. According to one embodiment, the choice of mark can be without limitation, except to the extent that it can be identified at a later time. This can be a significant advantage because the marks can be formed in such a way as to be relatively difficult to identify and remove by illicit copiers. Alternatively, the mark itself can be coded in such a way as to have some further meaning.

Figure 4A:
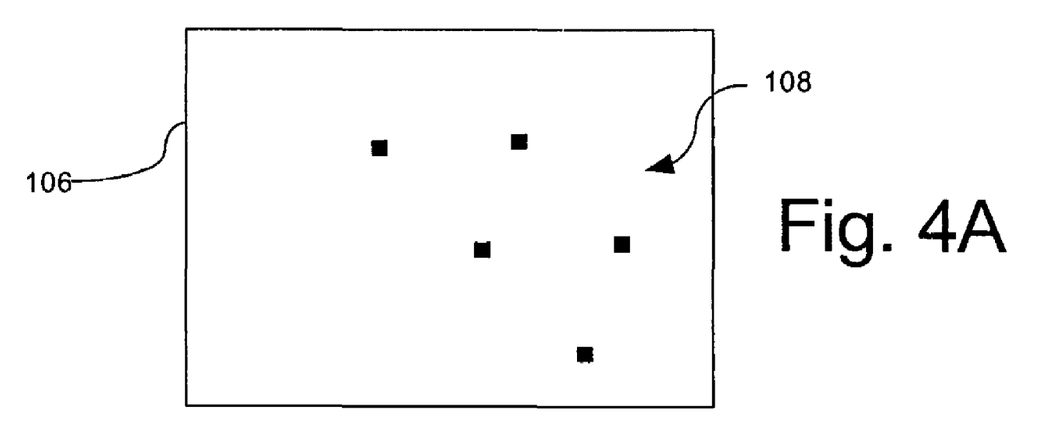
FIGS. 4A and 4B are diagrams that are useful for showing how different markings can be used to mark different prints of a film.
Figure 4B:
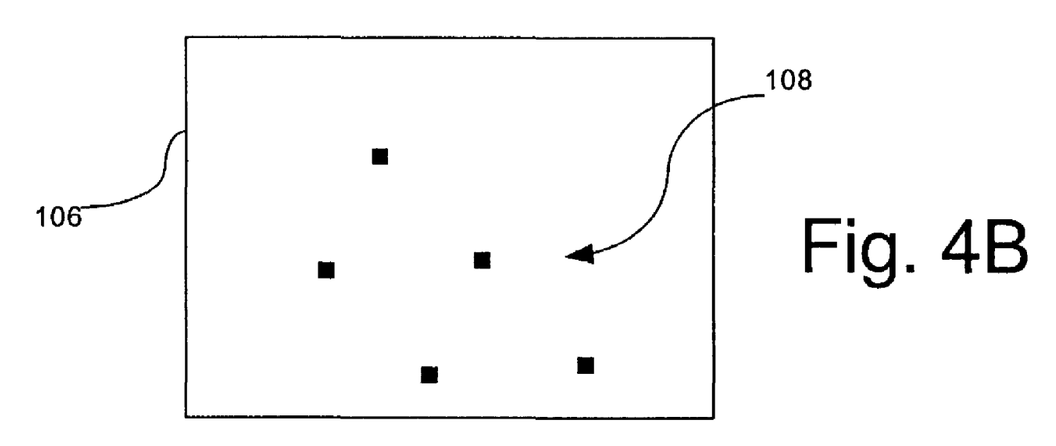

For example, where there exists more than one laboratory or production facility where the production copies of the motion picture are being created, the mark can be used to identify the particular location where the print was created. In that case, different production locations can be assigned different marks. This concept is illustrated in FIGS. 4A and 4B. FIG. 4A shows a frame 106 that includes a mark 108 that is comprised of a constellation of dots. The arrangement of the dots forming the constellation in FIG. 4A can signify a first production location. In contrast, FIG. 4B shows a frame 106 with a second mark 108 comprised of a constellation of dots having a different arrangement that can be used to identify a second production location.

According to one embodiment of the invention, the mark can be advantageously selected so that it is not readily apparent to a person who is viewing the motion picture. Accordingly, it can be desirable in that case to choose a mark such that its individual elements, such as dots or lines, are relatively small in size. Of course, the mark must be of sufficient size so as to be observable when the frame image is displayed. Further, the color of the mark or dots can be selected so that it provides only enough contrast with the motion picture image of the frame on which the mark has been placed so as to be clearly identifiable when the image contained in the frame is displayed. The color of the mark can also be varied for different scenes for this purpose. However, the invention is not limited in this regard and a single color could be used for all marks appearing in the various sequences and scenes.

A single frame could be used to mark a particular sequence for the purpose of encoding the particular production copy of a motion picture. However, this can be a disadvantage because modern video compression techniques employed with certain types of copying devices can partially or completely remove such markings when they appear only in a single frame. Accordingly, it can be advantageous for the purposes of the present invention to mark a plurality of consecutive frames 106 within a particular sequence 104, using the same mark having the same relative position within each frame. This consecutive marking will help ensure that the marks survive any video compression algorithm applied for the purpose of creating and/or distributing an illicit copy.

Increasing the number of consecutive marked frames can have drawbacks. In particular, increasing the number of consecutive frames that are marked tends to increase the likelihood that persons viewing the motion picture will become aware of their presence. This can be undesirable as it can interfere with the enjoyment of the motion picture or create the impression that a particular theater does not show high quality films. It can also alert those who illicitly record the motion pictures to the presence of the marks. In this regard, it has been found that two to five and preferably three consecutively marked frames strikes a satisfactory balance between avoiding perception of the marked frames and maintaining sufficient robustness of the marks. Still, it will be appreciated that more or fewer marked frames can be used and the invention is not limited to any particular number of consecutively marked frames.

The same or different marks can be used in different scenes 102. However, marks used within a particular sequence 104 on a plurality of consecutive frames are advantageously made identical to one another so as to avoid being lost when video compression techniques are applied during any subsequent illicit copying or transmission of the motion picture.

Frames can be marked using any suitable method appropriate for the media on which the motion picture is recorded. For example, if a particular production copy of the motion picture is recorded on a film media, then the image on a frame of the film can be modified in a manner similar to that which is used with conventional CAP coding. Such techniques are well known in the art. Still, those skilled in the art will appreciate that there are a wide variety of well known methods for placing an identifiable mark on one or more motion picture film frames that will be visible when the frame is displayed and the invention is not limited to any particular method. For example, the mark can be added to the film media at the time the film is printed. The marking can be accomplished using lasers to embed the mark, a film strip projector or slide projectors to overlay the mark on the film stock, a digital light projector (DLP) or any other suitable means to create on a particular frame of a film print an image corresponding to the desired mark.

Other, less sophisticated means, can also be used to mark the film stock. For example, a scratch tool could be used to manually scratch the mark into the film at the appropriate locations. However, this type of manual marking can lead to inconsistencies in the mark and therefore is not the preferred manner of marking. Marks can also be applied to the film directly with ink.

If the motion picture is digitally recorded, then the digital data associated with such recording medium can be modified in such a way as to produce the selected mark. For example, conventional DVD media can be modified so that a selected image will be caused to be overlaid on the image associated with one or more frames. If the selected image is the desired mark, then those particular frames within a marked sequence will appear to have the mark superimposed thereon when displayed. This image would be reproduced if the motion picture was recorded using a camcorder or other type of video recording device. Of course, those skilled in the art will appreciate that the particular type of recording media and compression scheme will affect the manner in which the digital data is modified and such methods are within the ordinary skill in the art. In this regard, the invention is not limited to any particular digital recording medium, video compression scheme, or method of modifying the digital media to associate the mark with the selected scenes of the motion picture. Any suitable method can be used to modify the digital data of the media in order to add the mark to a frame of the motion picture. Further, it should be noted that the word frame as used herein can include interlaced as well as non-interlaced video frames.

Notably, the coding process described herein can be repeated multiple times at various different locations on the media 100 on which the motion picture is disposed. In that case a second group of scenes 102 can be selected, each comprising an identifiable portion of the motion picture distinct from every other portion of the motion picture. As with the first group of scenes, two or more sequences 104 can be defined within each of the second group of motion picture scenes, with each of the sequences including two or more frames 106. Thereafter, the method can continue as described above, by marking at least one of the sequences from each of the second group of scenes to repeat the uniquely identifiable marking pattern. Alternatively, if the second group of scenes is contained on a second reel of film, a different coding pattern can be used.

Figure 3:
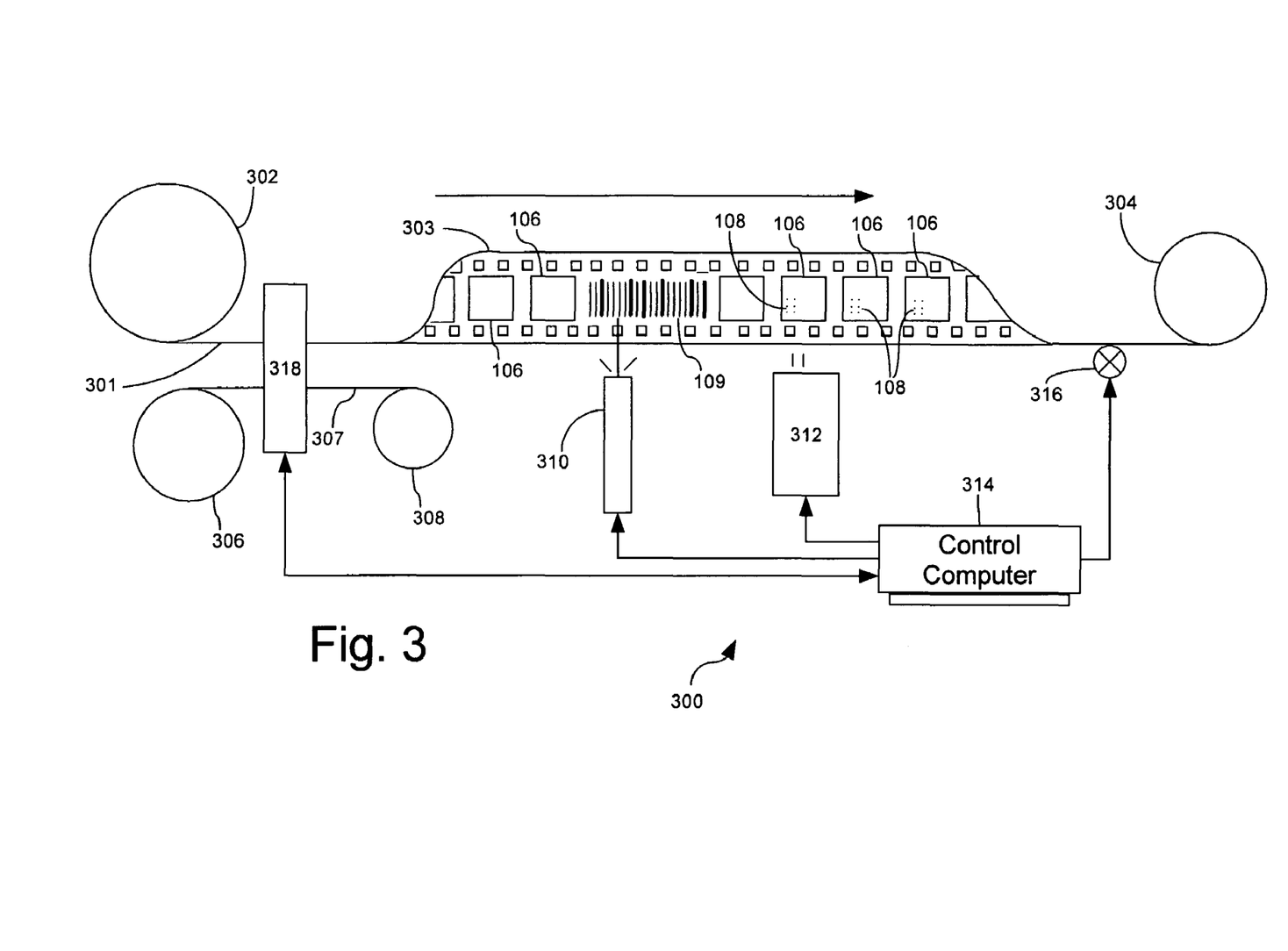
FIG. 3 is a block diagram that is useful for understanding an apparatus of the invention for marking a motion picture.

The invention can also include an apparatus for producing a motion picture disposed on a film media that includes the anti-piracy coding. Referring to FIG. 3, the apparatus 300 can create a coded production copy of a motion picture from a motion picture film negative 307. The apparatus can include a control computer 314 communicating with an encoder 316 and a marking device 312. A production copy of a motion picture can be created from a reel 302 of unexposed film stock 301 by passing the film through a printer 318. Printer 318 can be any of a variety of commercially available film print machines that is capable of creating a motion picture film print from film negative 307. Film negative 307 can be passed from reel 306 containing film negative to be printed, to reel 308 that spools film negative that has already been printed. Similarly, film stock 301 can be transferred from reel 302 containing unexposed film stock to reel 304 containing film that has been printed. Film stock 301 is passed through the printer 318 concurrently with film negative 307 and each frame of the film negative is transferred to the unexposed film stock 301 in the conventional manner well known to those skilled in the art.

As the motion picture images are transferred frame by frame from film negative 307 to film stock 301, the number of frames 106 that have been printed can be counted using information provided by encoder 316. Encoder 316 can be any of a variety of commercially available devices capable of counting frames 106 as the film is spooled from reel 302 to reel 304. For example, the encoder can be a sprocket wheel that engages sprocket holes in the print film 301. A shaft (not shown) can be optically encoded so that its rotation can be counted using an electro-optical sensor. Alternatively, any other type sensor including an electrical, electro-optical, mechanical or electro-mechanical sensor can be used for this purpose, provided that it is capable of communicating information to control computer 314 that directly or indirectly relates to the number of frames of film that are passed over the sprocket.

The code number corresponding to each production copy of a motion picture can be added to the media on which the production copy is disposed. For example, according to one embodiment, a scannable barcode 109 can be burned onto the film stock using a laser 310. This can allow for convenient identification of the particular production copy without searching for the anti-piracy coding marking as described herein. The barcode can be located in the leader area of the printed reel of film. Alternatively, the barcode can be placed onto the areas outside of or between the perforations in the film. Such placement can be advantageous for preventing the barcode from becoming visible to an audience viewing an exhibition of the motion picture. The laser 310 can be controlled by control computer 314 to produce the proper barcode on each film corresponding to the anti-piracy markings that have or will be added.

The present invention can be realized in hardware, software, or a combination of hardware and software. Control computer 314 can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system arranged as shown in FIG. 3 is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Control computer 314 can be provided with information regarding specific portions of the production copy of the motion picture that are to be marked. This information can be provided in any one or more of several different ways. According to one embodiment, the control computer can be provided with specific frame numbers relative to a reference point (e.g. the beginning of the motion picture) that are to be marked. Alternatively, the control computer can be provided with specific physical locations that are to be marked relative to the beginning of the film print. These specific physical locations can correspond to a set of frames within the sequence that is to be marked. In another embodiment, the control computer 314 can be provided with information identifying the scenes (e.g. by a range of frame numbers) within the film that are to be marked, the number of sequences within each scene, and the particular code number assigned to the particular production copy of the motion picture. The control computer 314 can then use this information to automatically identify the frame numbers that are associated with each sequence 104, and the specific sequence of frames that need to be marked in order to code the particular production copy of the film with the code number that has been assigned to it.

The control computer can also be programmed with information relating to the number of consecutive frames to be marked within each of the sequences, and the location of the frames (e.g. first three frames) that are to be marked within each marked sequence. Control computer 314 can control the selection of frames that are marked based on information provided by encoder 316 and control information from printer 318 regarding the number of frames that have been printed relative to some reference point such as the beginning of the film.

In FIG. 3, the marking process is shown occurring immediately after the printing process. However, those skilled in the art will appreciate that the invention is not limited in this regard. For example, the marking could be performed anytime before or after the motion picture is transferred to the film stock 301. The invention is also not limited to the precise arrangement shown in FIG. 3. For example, the marking device could conceivably be arranged to mark the film stock 301 before the film is fed to the printer 318.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method for uniquely identifying a copy of a motion picture disposed on a media comprising the steps of:
    selecting a plurality of motion picture scenes, each of said plurality of motion picture scenes comprising an identifiable portion of said motion picture distinct from every other portion of said motion picture;
    defining a plurality of sequences within each of said plurality of motion picture scenes, each said sequence comprising a plurality of frames;
    selectively marking at least one of said plurality of sequences from each scene with a mark to collectively define a uniquely identifiable marking pattern;
    selecting a second plurality of motion picture scenes, each of said second plurality of motion picture scenes comprising an identifiable portion of said motion picture distinct from every other portion of said motion picture;
    defining a plurality of said sequences within each of said second plurality of motion picture scenes, each said sequence comprising a plurality of said frames; and
    selectively marking at least one of said plurality of sequences from each of said second plurality of scenes scene to repeat said uniquely identifiable marking pattern.

2. The method according to claim 1 further comprising the step of selecting said motion picture scenes so that they are separated from each other by a buffer section of said motion picture.

3. The method according to claim 1 wherein said step of selecting said plurality of motion picture scenes further comprises selectively identifying portions of said motion picture that include relatively little motion.

4. The method according to claim 1 wherein said step of selecting said plurality of motion picture scenes further comprises selectively identifying portions of said motion picture that have at least one of lighting and coloration characteristics to enhance the visibility of said mark.

5. The method according to claim 1 wherein said selectively marking step is comprised of marking a plurality of consecutive frames in each said sequence that has been marked.

6. The method according to claim 1 wherein said selectively marking step is further comprised of marking at least one frame within each said sequence that has been marked.

7. The method according to claim 6 wherein said selectively marking step comprises marking three consecutive frames within each said sequence that has been marked.

8. The method according to claim 6 further comprising the step of selecting said at least one marked frame to include a first frame appearing within each sequence that has been marked.

9. The method according to claim 6 wherein said marking step further comprises modifying said media so that said mark is visible when an image associated with said frame is displayed.

10. The method according to claim 9 further comprising the step of forming said mark as a constellation of dots.

11. The method according to claim 10 further comprising the step of assigning a uniquely identifiable constellation of dots to each of a plurality of production locations.

12. The method according to claim 10 further comprising the step of forming each of said dots to have a profile corresponding to a predetermined shape.

13. The method according to claim 9 further comprising the step of selecting a color of said mark to enhance a contrast with an image associated with a frame.

14. The method according to claim 1 further comprising the step of selecting said motion picture to have three of said scenes, each divided into twenty eight of said sequences, and each said sequence containing 12 of said frames.

15. The method according to claim 1 further comprising the step of selecting said media to be film print.

16. The method according to claim 15 wherein said marking step is further comprised of physically forming said mark on at least one frame.

17. The method according to claim 1 further comprising the step of selecting said medium to be a digital storage medium.

18. The method according to claim 17 wherein said marking step is further comprised of modifying a digital data on said digital storage medium.

19. The method according to claim 18 wherein said modifying step is selected to cause said mark to appear within at least one image that is displayed during playback of said motion picture from said digital storage medium.

20. The method according to claim 1 wherein each of said sequences corresponds to a number and said selectively marking step further comprising marking respective ones of said sequences in each of said scenes so that the combination of the numbers of the sequences that are marked correspond to a film print identification number assigned to said copy.

21. The method according to claim 1 further comprising the step of varying said marking pattern for each production copy of said motion picture so that no two copies of said motion picture have the same marking pattern.

22. A security coded motion picture disposed on a media comprising:
    a plurality of motion picture scenes, each of said plurality of motion picture scenes comprising an identifiable portion of said motion picture distinct from every other portion of said motion picture;
    a plurality of sequences predefined within each of said plurality of motion picture scenes, each said sequence comprising a plurality of frames;
    a second plurality of motion picture scenes, each of said second plurality of motion picture scenes comprising an identifiable portion of said motion picture distinct from every other portion of said motion picture;
    a plurality of said sequences within each of said second plurality of motion picture scenes, each said sequence comprising a plurality of said frames; and
    wherein at least one of said plurality of sequences from each of said plurality of motion picture scenes includes a mark, said marked sequences collectively defining a uniquely identifiable marking pattern and at least one of said plurality of sequences from each of said second plurality of scenes is marked to repeat said uniquely identifiable marking pattern.

23. The security coded motion picture according to claim 22 wherein each of said motion picture scenes are separated from each other by a buffer section of said motion picture.

24. The security coded motion picture according to claim 22 wherein said plurality of motion picture scenes is comprised of portions of said motion picture that include relatively little motion.

25. The security coded motion picture according to claim 22 wherein said plurality of motion picture scenes have at least one of density, lighting and coloration characteristics selected to enhance the visibility of said mark.

26. The security coded motion picture according to claim 22 wherein each of said sequences that is marked comprises a plurality of consecutive marked frames.

27. The security coded motion picture according to claim 22 wherein each of said sequences that is marked is comprised of at least one marked frame.

28. The security coded motion picture according to claim 22 wherein each of said sequences that is marked is comprised of three consecutive frames that have been marked.

29. The security coded motion picture according to claim 27 wherein said at least one marked frame comprises at least a first frame appearing within said sequence that has been marked.

30. The security coded motion picture according to claim 27 wherein said marked frame comprises said mark superimposed on an image associated with said at least one frame so that said mark is visible when said image is displayed.

31. The security coded motion picture according to claim 30 wherein said mark is a constellation of dots.

32. The security coded motion picture according to claim 31 wherein said constellation of dots is exclusively associated with one of a plurality of production locations.

33. The security coded motion picture according to claim 31 wherein each of said dots to has a profile corresponding to a predetermined shape.

34. The security coded motion picture according to claim 30 wherein a color of said mark contrasts with an image associated with a frame to facilitate subsequent detection.

35. The security coded motion picture according to claim 22 wherein said motion picture contains at least three of said scenes, each divided into at least ten of said sequences, and each said sequence containing at least eight of said frames.

36. The security coded motion picture according to claim 22 wherein said media is a film print.

37. The security coded motion picture according to claim 36 wherein said mark comprises an image disposed on said film print.

38. The security coded motion picture according to claim 22 wherein said medium is a digital storage medium.

39. The security coded motion picture according to claim 38 wherein said digital data on said digital storage medium is modified to produce said marking.

40. The security coded motion picture according to claim 39 wherein said digital data is modified to cause said marking to appear within at least one image that is displayed during playback of said motion picture from said digital storage medium.

41. The security coded motion picture according to claim 22 wherein each of said sequences corresponds to a number and the combination of the numbers of the sequences that are marked correspond to a film print identification number assigned to a particular production copy of said motion picture.

42. The security coded motion picture according to claim 22 wherein said marking pattern for each copy of said motion picture is different for each production copy of said motion picture.

43. An apparatus for uniquely identifying a copy of a motion picture disposed on a media comprising:
means for selecting a plurality of motion picture scenes, each of said plurality of motion picture scenes comprising an identifiable portion of said motion picture distinct from every other portion of said motion picture;

means for defining a plurality of sequences within each of said plurality of motion picture scenes, each said sequence comprising a plurality of frames;

means for selectively marking at least one of said plurality of sequences from each scene to collectively define a uniquely identifiable marking pattern;

means for selecting second plurality of motion picture scenes, each of said second plurality of motion picture scenes comprising an identifiable portion of said motion picture distinct from every other portion of said motion picture;

means for defining a plurality of said sequences within each of said second plurality of motion picture scenes, each said sequence comprising a plurality of said frames; and means for selectively marking at least one of said plurality of sequences from each of said second plurality of scenes to repeat said uniquely identifiable pattern.

44. An apparatus for uniquely identifying a copy of a motion picture disposed on a media comprising:
means responsive to a user input identifying a plurality of motion picture scenes, for defining a plurality of sequences within each of said plurality of motion picture scenes, each said sequence comprising a plurality of frames; and means for selectively marking at least one of said plurality of sequences from each scene to collectively define a uniquely identifiable marking pattern;

means responsive to a user input identifying a second plurality of motion picture scenes, each of said second plurality of motion picture scenes comprising an identifiable portion of said motion picture distinct from every other portion of said motion picture;

means for defining a plurality of said sequences within each of said second plurality of motion picture scenes, each said sequence comprising a plurality of said frames; and selectively marking at least one of said plurality of sequences from each of said second plurality of scenes to repeat said uniquely identifiable marking pattern;

wherein each of said plurality of motion picture scenes comprises an identifiable portion of said motion picture distinct from every other portion of said motion picture.

45. The apparatus according to claim 44 wherein said means for selectively marking marks three consecutive frames within each said sequence that has been marked.

46. The apparatus according to claim 44 wherein said means for selectively marking marks at least one frame in each of said sequences that are marked.

47. The apparatus according to claim 46 wherein said at least one frame in each said sequence includes a first frame appearing within each said sequence.

48. The apparatus according to claim 46 wherein said means for selectively marking modifies said media to cause a mark to be associated with each said frame that has been marked so that said mark is visible when said image is displayed.

49. A security coded motion picture comprising:
a motion picture recording comprised of a plurality of frames, each containing at least a portion of an image associated with said motion picture, at least one predetermined frame of said motion picture defining a reference point relative to which a plurality of other frames can be uniquely identified; and at least one of said frames containing a mark, a position of said at least one marked frame relative to said reference point uniquely identifying a particular production copy of said motion picture;

wherein a plurality of said marked frames collectively define a uniquely identifiable marking pattern.

50. The security coded motion picture according to claim 49 wherein each said marked frame is part of a series of consecutively marked frames.

51. The security coded motion picture according to claim 50 wherein there are between two to ten marked frames in each said series.

52. A method for security coding a motion picture comprising:

storing on a media a motion picture recording comprised of a plurality of frames, each containing at least a portion of an image associated with said motion picture; and selectively marking a plurality of said frames having an identifiable position relative to at least one predetermined reference point frame in said motion picture, with a predetermined mark, said position of said plurality of marked frames collectively uniquely identifying a particular production copy of said motion picture.

53. The method according to claim 52 further comprising the step of forming each said marked frame as part of a series of consecutively marked frames.

54. The method according to claim 53 further comprising the step of forming from two to ten marked frames in each said series.

55. Apparatus for security coding a motion picture comprising:

means for storing on a media a motion picture recording comprised of a plurality of frames, each containing at least a portion of an image associated with said motion picture; and means for selectively marking a plurality of said frames having an identifiable position relative to at least one predetermined reference point frame in said motion picture, with a predetermined mark, said position of said plurality of marked frames collectively uniquely identifying a production copy of said motion picture.

* * * * *